United States Patent [19]

Milton

[11] Patent Number: 5,361,018
[45] Date of Patent: Nov. 1, 1994

[54] INTERMEDIATE VOLTAGE CABLE MARKER WITH ENHANCED CONSPICUITY

[76] Inventor: Richard M. Milton, 6809 Falcata Cove, Austin, Tex. 78750

[21] Appl. No.: 103,216

[22] Filed: Aug. 9, 1993

[51] Int. Cl.⁵ .................................. H05B 41/16
[52] U.S. Cl. .......................... 315/248; 315/344; 315/227 R; 315/76; 340/981; 340/982
[58] Field of Search ............ 315/344, 76, 248, 227 R; 340/983, 982, 981; 362/391, 308

[56] References Cited

U.S. PATENT DOCUMENTS

| | | | |
|---|---|---|---|
| 2,028,906 | 1/1936 | Higgins | 315/227 R |
| 2,095,306 | 10/1937 | Austin | 340/983 |
| 4,037,191 | 7/1977 | Deane et al. | 340/983 |
| 4,420,740 | 12/1983 | Brown et al. | 362/391 X |
| 4,839,567 | 6/1989 | Milton et al. | 315/344 |
| 5,001,402 | 3/1991 | Milton et al. | 315/344 |

*Primary Examiner*—Robert J. Pascal
*Assistant Examiner*—Haissa Philogene
*Attorney, Agent, or Firm*—Joseph F. Long

[57] ABSTRACT

An intermediate voltage or cable marker with a gas filled lamp with reflectively enhanced conspicuity comprising an inner conductive coating in an opaque shell; the shell being mountable on an the intermediate voltage line and having one end of the gas filled lamp electrically connected to the intermediate voltage line or grounded cable and the other end electrically connected to a electrical coil in series with the conductive inner shell coating; the gas filled tube being mounted in a reflective chamber shaped to increase both lateral and vertical conspicuity.

10 Claims, 2 Drawing Sheets

INTERMEDIATE VOLTAGE CABLE MARKER WITH ENHANCED CONSPICUITY

BACKGROUND OF THE INVENTION

This invention relates to the marking and lighting of intermediate voltage powerlines which are less than 69,000 volts (phase to phase) and are primarily in the distribution range of 5,000 to 35,000 volts (phase to phase). Marking these phase lines with an illuminated spherical or elliptical obstruction marker decreases accidental contact by low flying aircraft, high profile water craft, construction, and industrial vehicles. The closest prior art is referenced by U.S. Pat. No. 5,001,402 and U.S. Pat. No. 4,839,567 for high voltage lines. These are incorporated herein by reference. This invention uses a smaller physical size than U.S. Pat. No. 5,001,402 and U.S. Pat. No. 4,839,567 in order to maintain safe distances between the phase lines and the exterior of the invention. In using a smaller physical size, below FAA recommended spherical diameters for obstruction marking of power lines, major changes must be made to achieve a 2000' conspicuity. A different size or shape of the unit must be used on intermediate voltage lines because of line spacing. In prior art, the spherical shape was used to put as much of the capacative surface away from the electrical line as possible to give the greatest possible potential difference between the shell and the line. Since the unit outlined in the prior art has a greater diameter, the capacitive surface area is much greater and consequently, greater electrical potential difference and greater circuit current exists. This invention must utilize a smaller capacitive area and coupled with the lower operational voltages, usually in the range of 7,900 volts to 16,000 volts (phase to ground), the unit must operate at a significant power reduction to activate the gas filled lamp. Additional capacitive area is attained by elongating the unit without sacrificing electrical phasing safety margins. We have found experimentally, using light enhancers, that a conspicuity of 2,000 feet may be obtained using a gas filled tube of approximately 54" in length, 5 mm in diameter, and with a internal pressure of 19 mm. In prior art, two 120" tubes, 10 mm in diameter and with 10 mm pressure was used. The smaller tube needs to be charged with much higher pressure (over 10 mm) to at reduce inherent electrical resistance and the smaller tubing restricts the ionization electron column to give greater lamp intensity per inch. With the decrease in capacitive relationships in the unit, the tubes may be placed in closer proximity to each other to create a brighter concentrated light without excess heat or capacitive shorting. With the concentration of the light, additional reflectors must be used for the dispersion of the light to increase visibility below or above the unit. Prior art utilized two sets of 10 mm tubing at 10–12 mm pressure in lamp tubes 120" in length to handle a variety of high voltages, reduce heat as a debilitating factor to lamp life and achieve visibility of the device that exceeds 4000'. Two lamps were used to give directional light by placing each lamp about the hemisphere with the lamping center 180 degrees from each other. Since the smaller conductors are primarily used in the construction of these intermediate voltage distribution lines, as compared with high voltage lines, rotational problems occur for single source lighting. Reflectors and prismatic film were used to concentrate the effective beam spread to give greater visibility to the areas that were suspect to vehicles approaching the installed unit.

We have found that a set of inductors will, through counter electromotive force (CEMF), induce a staggered discharge of the circuit and sustain more ionization in the lamp. This CEMF occurs as a reaction to changes in the voltage and current. This enhances the uniformity of the illumination. Prior art had no use for this type of staggered discharge because of the higher voltage and current that normally discharged from the larger capacitor. These coils, by weight and placement, are also used as a counter balance to reduce the rotational effects of the device when it is installed where the power line runs through the center of the unit. Additional attachment procedures are explained in the drawings; these include a gimbaled device and a device hung from the power line using a flexible cable.

In summary, the subject invention must use a specific physical form to maximize the operation of a smaller concentrated neon gas lamp because of voltage and dimensional restrictions and must use light dispersion techniques to enhance conspicuity to provide the necessary 2000'–2500' visibility.

SUMMARY OF THE INVENTION

This invention comprises an opaque shell that is sausage shaped in one embodiment, elliptical shaped in another embodiment, and a light separated from a spherical shell in another embodiment. Maximum diameter for the shell is approximately 20" to allow for mounting on an intermediate voltage line or cable with sufficient clearance to prevent arcing to the adjacent lines. The opaque shell is fabricated in two halves to permit longitudinal mounting on the intermediate voltage lines in two of the embodiments. The upper half is fitted with a depressed chamber or depression covered with a transparent Lexan TM covering to allow mounting a gas filled tube about to 54" in length and 5 mm in diameter and with the neon under about 19 mm in pressure. An electrode on one end of this neon tube is electrically connected to an intermediate voltage line and the other electrode of the gas filled tube is electrically connected to a set of mutually inductive coils and the coils are electrically connected in series to a conductive coating inside the opaque shell. Normally, conductive coating inside both halves of the opaque shell is electrically connected to create on capacitor but the coils may be connected in series/parallel or series to the shell halves. This arrangement provides for the excitation of the neon gas to cause illumination. To enhance conspicuity, the depression or chamber is curved to follow the contour of the shell's exterior shape, while the bottom of the depression forms an upside down "V", whose apex is in the middle of the depression. The cross section of the depression is somewhat rectangular, with the sides of the chamber angled in at 10 degrees on each side to allow greater beam spread of the light. The depression is vacuum plated for reflectivity of the neon tube. The reflective chamber is usually electrically connected to the electrode of the lamp which connects to the coil. This connection bleeds any transient voltage that may build up in the reflective area to avoid corona burns or operator hazard. The neon tube is contoured by several runs through the chamber and those runs closely parallel the bottom of the chamber. The neon tube apex extends above the surface contour of the opaque shell. The depression is covered by ultraviolet resistant Lexan ™ polycarbonite, which is formed to seal the chamber from weather elements and accommodate the apex of the protruding neon lamp. The protrusion of the cover is formed to accommodate multiple prismatic lens diffusers, which are fused to the cover, to enhance off-axis visibility to light emissions from the light chamber and aids visibility due to wind disorientation. The inductive coil acts as a ballast to thwart disorientation. In addition to the ballast, a gimbaled bracket may be physically attached to the line and the opaque shell physically attached to the gimbaled bracket to reduce any permanent disorientation from extended exposure to wind and vibratory movements.

In another embodiment, a spherical opaque sphere hangs on a flexible cable below the power line and physically and electrically to a clear housing holding the illuminating neon tube. The lamping unit runs parallel and adjacent to the power line. Diffusers are also used to aid in the beam spread of the lamp.

This device works on a difference in electrical potential. In the current method, the device draws power from the electrical conductor to a capacitor, whose potential is measured by the difference of the phase line and the field voltage of the air at an measured distance from the phase line. It has been demonstrated in testing, that this device, electrically connected to a grounded wire and gathering field voltage at the capacitor from the electrical field around a power line, operates the lamp. Should this device be mounted on a static or ground wire near a power transmission line and subjected to an electrical field, sufficient to cause a large potential difference between the static line and the capacitor, the lamp will operate to generate a least a 2000' conspicuity.

Frequency has a direct effect in the ionization of the lamp gas. In testing the threshold ionization of the neon gas used in the lamp, the higher the applied electrical frequency to the gas decreases the need for a very high electrical potential difference needed for threshold firing of the gas. Should this device be mounted in an area adjacent to a sufficient field strength of a high frequency nature, such as those used in radio and TV broadcast towers, and have one end of the lamp electrically connected to a grounded cable or guy wire, the lamp should produce a conspicuity of at least 2000'. The unit intensity will, of course, be effected by the device's proximity to the antenna, the broadcast power of the antenna, and frequency of the transmitter. The shell's conductive lining in this case acts as a receiver and induces the transmission emissions through conductive lining and allowing that induced power to ground out on the grounded cable or wire. In the case of AM towers where the entire structure emanates a powerful frequency, the unit itself will act as part of the tower structure and the lamp will energize because the device acts as part of the broadcast device.

DETAILED DESCRIPTION OF THE INVENTION

The invention may best be described from the drawings.

Figure 1:
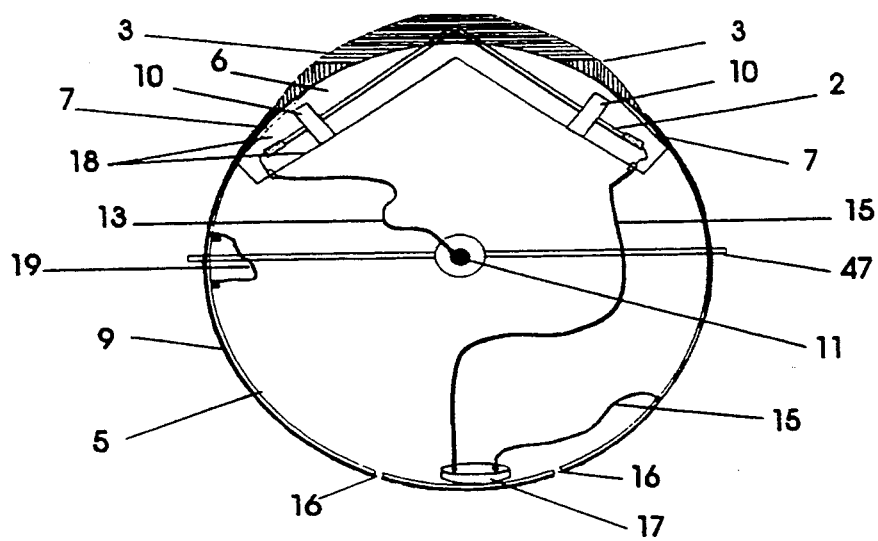
FIG. 1 shows a cross section of one preferred embodiment of the unit mounted on an electrical cable or wire.

In FIG. 1 we show one preferred embodiment comprising a non conductive split opaque fiberglass shell 9 mounted on an intermediate voltage electrical wire or cable 11.

A transparent Lexan ™ cover 7 covers the reflective chamber 6 containing a neon tube 2. Normally this opaque shell is colored aviation orange for daytime visibility. In one preferred embodiment, the shell is about 20 inches in diameter and 30 inches in length. The shape may be modified, but the shape should allow a sufficient area for the internal capacitor and enough physical diameter to be used as a daytime obstruction device. The shape should be aerodynamic to minimize wind loading.

Shell 9 may be formed in fiberglass from a polyester resin and covered with a sealing gel-coat for weather ability. Several plastics or polymers may be used in the construction of the shell, but must have color retention and durability. Typically, shell thickness is about $\frac{1}{8}"$. Light weight is desirable to minimize wear and loading on cable 11. The halves of the shell may be conveniently made with a lip or flange 47 and may be snapped or bolted together to reduce element intrusion. Drain holes 16 are provided to drain moisture from the shell by gravity flow. If the shell is turned so that the light is used for ground traffic only, then the drain holes and ballasts are located in the proximity of the lamp. Conductive coating 5 may be a 5 mil thick metallic paint sprayed to form a capacitor on the shell's interior. Conductive screens, polymers, or resins could also be used. Conductive lead 19 is used to electrically connect the conductive coating in the two halves of the shell. Dual inductive coils 17 may be glued in place to provide ballast as well as to provide a staggered phasing to increase conspicuity of neon lamp 2. The neon tube 2 is 54 inches long, 5 mm in diameter and is filled with neon gas under about 19 mm of pressure. The 54 inch tube may be bent to give two or more parallel strands of tubing in the reflective chamber. The tube is fitted with an electrode in each end. We have found by experimentation that with this configuration and gas pressure that the neon lamp 2 will be brightly illuminated when mounted on a 7900 volt (phase to ground) line. At the same time the neon lamp 2 should perform equally well without generating undo heat on a 40,000 volt (phase to ground) line. Lower temperature operation is desirable and should give a lamp life measured in years. Tube replacement can be quite expensive as some installations are made by using a helicopter.

Neon lamp 2 is electrically connected at one end to the mounting wire 11 through lead 13 and the other end to dual inductive coils 17 through lead wire 15. Inductive coils 18 each weigh about one pound and have approximately 300 turns of No. 26 gauge copper wire and are themselves connected in series and then electrically connected to the conductive coating 5. Neon lamp 2 is mounted with non-conductive holders 10 in unit 6 which is conveniently made of plastic. The sides, ends and bottom of the trough shaped unit 6 are preferably vacuum plated with reflective aluminum 18 and are electrically connected to lead 15 for anti-corona and safety discharge. Transparent Lexan ™ lens 7 is contoured for diffuser prismatic 3M SOLF ™ film 3 to direct light to increase side visibility.

Figure 2:
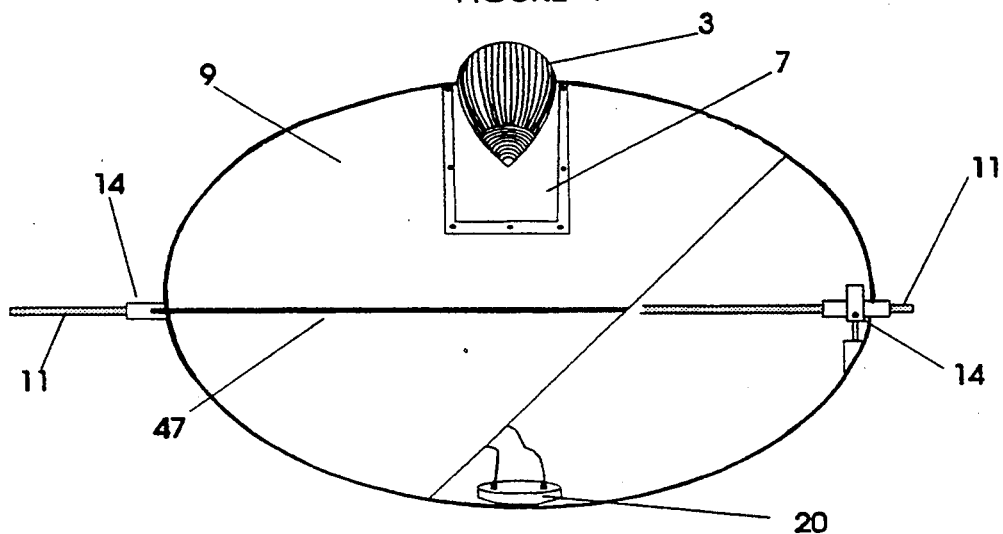
FIG. 2 shows a side view of FIG. 1.

In FIG. 2 we show an embodiment of shell 9, which is elliptically or sausage shaped with unit 6 mounted at right angles to give the necessary 2000' conspicuity, even if the shell 9 orientation is altered somewhat by wind moving the unit. Stabilizer ballast 20 will tend to correct wind movement of the shell 9 by weighting the lowest area of shell 9. Clamps or hangers 14 fasten the shell to the wire or cable 11 and also act as an insulator against electrical shorting. Flange 47 may be used to clip or bolt the two halves of shell 9 together.

Figure 3:
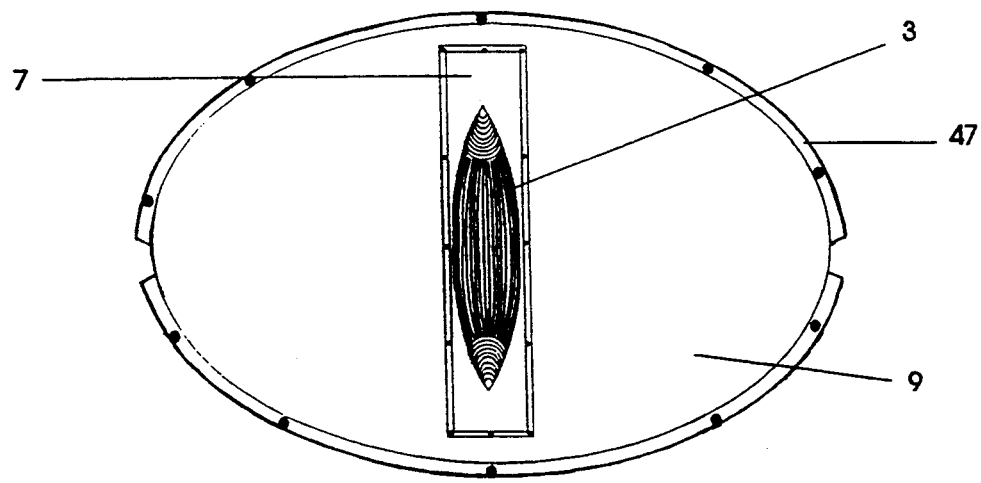
FIG. 3 shows a top view of FIG. 1.

In FIG. 3, we have shown a top view of FIG. 1. The transparent cover 7 can be more fully observed with the prismatic lens 3. The flange 47 encircles the shell 9 for attachment of the two halves to reduce element intrusion.

Figure 4:
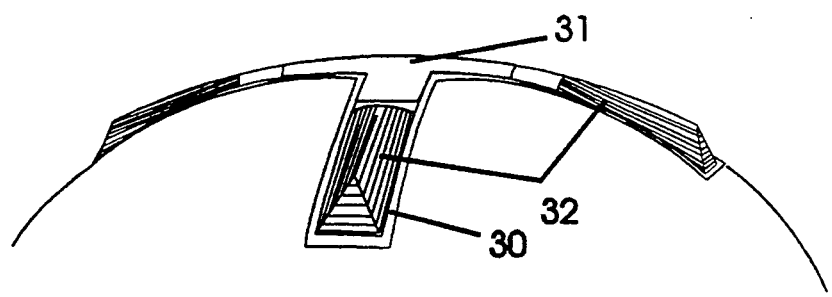
FIG. 4 shows detail of the light chamber in a second embodiment of the unit.

In FIG. 4, we have shown a frontal view of a second embodiment of the unit wherein chamber 30 holding the neon tube would be in the shape of a cross as viewed from the top. Area 31 is an inner reflective area to increase light output in area 32. Areas 32 are lined with prismatic diffusing SOLF ™ film to redirect the output of the light emissions from the chamber 30. The lens 32 has a raised area to increase the vertical beam spread greater than 180 degrees to lateral areas. With the light output from the chamber 30 and with the remainder of the unit is as previously described under FIG. 1, the unit achieves the necessary 2000' conspicuity.

Figure 5:
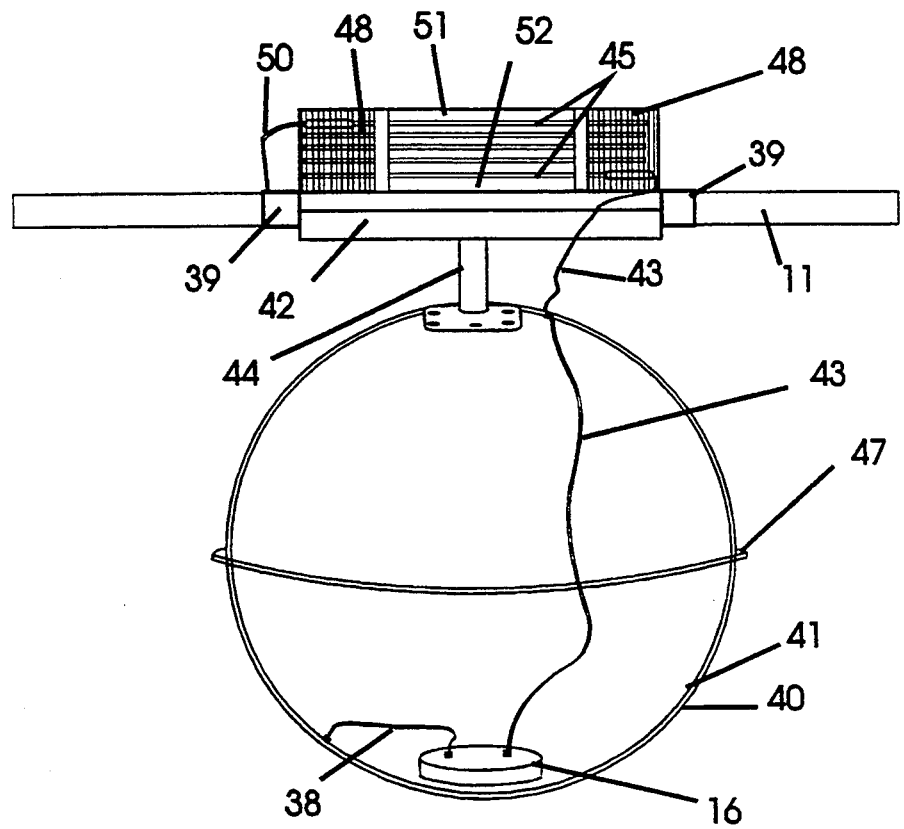
FIG. 5 shows a side view of a third embodiment.

In FIG. 5, we have shown an embodiment where an opaque shell 40 is connected by a flexible cable 14 to lamp mounting unit 42. Clamps 39 mount the unit on and insulate from wire or cable 11. Shell 40 is internally coated with a conductive material 41, such as a conductive paint, metal, etc., to form a capacitor when connected to a high voltage source. Wire 38 electrically connects conductive material with induction coils 16 which are connected in series. Wire 43 electrically connects dual coils 16 to a one electrode of the neon filled tube 45. For intermediate voltage power lines, we have found that this tube has sufficient illumination when the tube is about 5 mm in diameter at 54" in length and is filled with 19 mm of gas pressure. The other electrode of the neon tube 45 is electrically connected through wire 50 to cable 11. The transparent cover 51 is made from Lexan ™ and utilizes the prismatic film areas 48 to diffuse light for greater side visibility. Reflector 52 aids in the diffusion of the light. Shell 40 may be held together by bolted or clipped flange 47.

Figure 6:
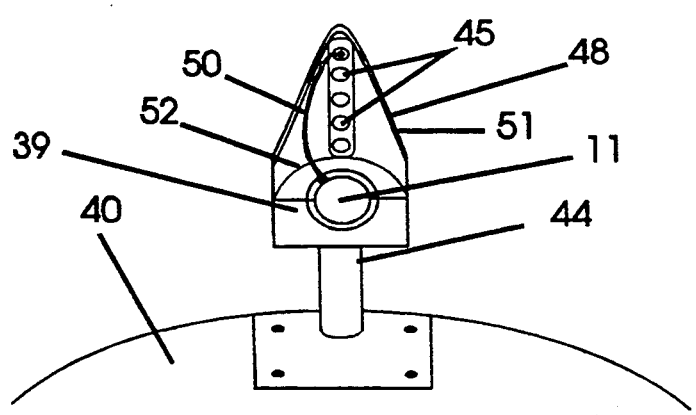
FIG. 6 shows a side view of FIG. 5 to indicate details of light enhancement.

In FIG. 6, we have shown a cross sectional view of the lamp FIG. 4 to indicate light enhancements by reflectors 52 mounted inside the transparent enclosure 51 such as Lexan ™, and diffusing prismatic film 48 mounted in the transparent enclosure 51 surrounding the neon tubes 45. Mounting unit 42 is attached on line 11 with clamps 39 as previously shown. Mounting unit is electrically insulated from cable 11, except for wire 50, to eliminate surface conduction. The flexible cable 44 is attached to mounting unit 42 and has enough clearance not to interfere with line 11 due to wind movement of the shell 40.

What is claimed is:

1. An intermediate voltage cable marker with enhanced conspicuity comprising:
   a) a capacitor and an insulating shell; said insulating shell being attachable to said intermediate voltage cable; and said shell having a conductive member inside said shell whereby said shell forms said capacitor;
   b) reflector and prism means and a minimum of one gas filled lamp located in a depression in said shell with said lamp electrically connected on a first end to said intermediate voltage cable and electrically connected on a second end to a first of a dual induction coil with a first one of said dual induction coils connected in series with a second of said dual induction coils and with said second dual induction coil electrically connected with said conductive member forming said capacitor; said reflector means being located on the sides and below said lamp in said depression to reflect light through said prism means; said prism means being located on a transparent covering for said depression and acting to diffuse light from the periphery of said prism means to increase both vertical and lateral conspicuity.

2. An intermediate voltage cable marker with enhanced conspicuity comprising:
   a) a non-conductive sausage shaped shell fastenable to said intermediate voltage cable and having a conductive inner coating in said shell to form a capacitor;
   b) a gas filled tube means with electrical connections on both a first end and second end; said gas in said gas filled tube means being energized to produce light and said gas filled tube means being located in a depression in said shell with said first end being electrically connected to said intermediate voltage line and said second end being electrically connected to dual induction coils;
   c) said dual induction coils being connected to said capacitor.

3. An intermediate voltage cable marker with enhanced conspicuity as in claim 2 wherein said gas filled tube is a maximum of 5 mm in internal diameter, approximately 54" in length, and is filled with neon gas under approximately 19 mm of neon pressure.

4. An intermediate voltage cable marker with enhanced conspicuity as in claim 2 wherein said light enhancement means comprises a reflective means on the bottom and on the sides of said depression and a prismatic light diffuser located on a transparent covering for said depression.

5. An intermediate voltage cable marker with enhanced conspicuity comprising;
   a) a two piece opaque non-conducting shell mountable on said cable;
   b) a tube approximately 54" in length, 5 mm in diameter, and filled with 19 mm pressure of gas, mounted in a depression in said shell;
   c) a conductive lining in said shell to form a capacitor;
   d) electrical connectors to connect a first end of said tube to an intermediate voltage cable and a second end to said dual coils; electrical connectors to connect in series a first coil to second coil and said second coil to said capacitor;
   e) a reflector on the sides and below said tube in said depression and a transparent cover means sealed to make a water tight cover over said depression;
   f) diffracting type prisms mounted on raised areas of said transparent cover and;
   g) a stabilizing weighted means acting to minimize the rotation of said shell on said cable.

6. An intermediate voltage cable marker with enhanced conspicuity comprising;
   a) a housing unit mounted on an intermediate voltage cable;
   b) an opaque non-conducting shell suspended from said unit by a flexible cable;
   c) a conductive coating inside said shell to form a capacitor;
   d) a pair of induction coils mounted inside said shell
   e) a neon gas filled tube mounted inside a depression in said housing unit and electrically connected on a first end to said intermediate voltage line and on a second end to a first of said induction coils; said coils being connected in series between said neon gas filled tube and said conductive coating forming said capacitor;
   f) a light enhancement means comprising a reflector below said gas filled tube and diffracting type prism means mounted on a transparent covering above said gas filled tubes to directionally diffract the light emanating from said neon tube.

7. A cable marker attached to an electrically grounded cable with enhanced conspicuity comprising:
   a) a capacitor and an insulating shell; said insulating shell being attachable to said grounded cable; and said shell having a conductive member inside shell whereby said shell forms said capacitor;
   b) reflector and prism means and a minimum of one gas filled lamp located in a depression in said shell with said lamp, electrically connected on a first end to said grounded cable and electrically connected on the second end to dual induction coils in series with said conductive member forming said capacitor; said reflector means being located on the sides and below said lamp in said depression to reflect light through said prism means diffuser; said prism means being located on the transparent covering for said depression and acting to diffuse light from the periphery of said prism means to increase both vertical and lateral conspicuity.

8. A cable marker attached to an electrically grounded cable with enhanced conspicuity comprising:
   a) a non-conductive shell fastenable to said ground cable and having a conductive inner coating in said shell to form a capacitor; said ground cable being located in a high voltage field;
   b) a gas filled tube means with electrical connections on both a first end and second end; said gas in said gas filled tube means being energized to produce light and said gas filled tube means being located in a depression in said shell with said first end being electrically connected to said grounded cable and said second end being connected to said capacitor;
   c) a reflector means located in said depression to reflect light upwards;
   d) a prismatic covering over said depression to directionally diffuse light reflected from said gas filled tube means.

9. A cable marker attached to an electrically grounded cable as in claim 7 where said cable marker is located in close proximity to a high frequency broadcast transmitter.

10. A cable marker attached to an electrically grounded cable with enhanced conspicuity as in claim 8 wherein said gas filled tube means is a tube approximately 54" in length, 5 mm in diameter, and is filled with a gas approximately 19 mm in pressure.

* * * * *